US012475965B2

United States Patent
Smith et al.

(10) Patent No.: US 12,475,965 B2
(45) Date of Patent: Nov. 18, 2025

(54) APPARATUSES AND METHODS FOR CONFIGURABLE ECC MODES

(71) Applicant: Micron Technology, Inc., Boise, ID (US)

(72) Inventors: Scott E. Smith, Boise, ID (US); Sujeet Ayyapureddi, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/504,302

(22) Filed: Nov. 8, 2023

(65) Prior Publication Data

US 2024/0170088 A1 May 23, 2024

Related U.S. Application Data

(60) Provisional application No. 63/383,865, filed on Nov. 15, 2022.

(51) Int. Cl.
G11C 29/42 (2006.01)
G06F 11/10 (2006.01)
(Continued)

(52) U.S. Cl.
CPC .......... G11C 29/42 (2013.01); G06F 11/1016 (2013.01); G06F 11/102 (2013.01);
(Continued)

(58) Field of Classification Search
CPC ............... G06F 11/1044; G06F 11/102; G06F 11/1016; G06F 2211/104; G11C 29/52; G11C 29/42; H03M 13/2906; H03M 13/05
See application file for complete search history.

(56) References Cited

U.S. PATENT DOCUMENTS 5,434,814 A 7/1995 Cho et al.
6,249,476 B1 6/2001 Yamazaki et al.
(Continued)

FOREIGN PATENT DOCUMENTS

WO 2016048634 A1 3/2016
WO 2024107367 A1 5/2024
(Continued)

OTHER PUBLICATIONS

U.S. Appl. No. 18/734,189, titled "Apparatuses, Systems, and Methods for Managing Metadata Storage At a Memory" filed Jun. 5, 2024, pp. all pages of application as filed.
(Continued)

Primary Examiner — John J Tabone, Jr.
(74) Attorney, Agent, or Firm — Dorsey & Whitney LLP

(57) ABSTRACT

Apparatuses, systems, and methods for an enhanced ECC mode. The memory array includes a number of data column planes and an extra column plane. When the memory device is set in an Enhanced ECC mode, data is stored in a subset of the data column planes, and an error correction code circuit (ECC) stores corresponding parity data in one of a column plane other than one of the subset of data column planes or the extra column plane. In this manner, memory may be capable of performing single error correction or single error correction with double error detection (SECDED) depending on the mode selected.

20 Claims, 6 Drawing Sheets

(51) Int. Cl.
   *G11C 29/52*   (2006.01)
   *H03M 13/05*   (2006.01)
   *H03M 13/29*   (2006.01)

(52) U.S. Cl.
   CPC .......... *G06F 11/1044* (2013.01); *G11C 29/52* (2013.01); *H03M 13/05* (2013.01); *H03M 13/2906* (2013.01); *G06F 2211/104* (2013.01)

(56) References Cited

U.S. PATENT DOCUMENTS

| | | |
|---|---|---|
| 7,117,421 B1 | 10/2006 | Danilak |
| 9,158,617 B2 | 10/2015 | Cho et al. |
| 9,361,960 B2 | 6/2016 | Vogelsang |
| 9,607,679 B1 | 3/2017 | Kim et al. |
| 9,880,901 B2 | 1/2018 | Zastrow |
| 9,996,799 B2 | 6/2018 | Bostick et al. |
| 10,127,101 B2 | 11/2018 | Halbert et al. |
| 10,222,989 B1 | 3/2019 | Zitlaw |
| 10,243,590 B1 | 3/2019 | Seshadri |
| 10,810,079 B2 | 10/2020 | Halbert et al. |
| 10,817,371 B2 | 10/2020 | Rooney et al. |
| 10,872,011 B2 | 12/2020 | Bains et al. |
| 10,929,033 B2 | 2/2021 | Meeker et al. |
| 10,937,517 B1 | 3/2021 | Rich-Plotkin et al. |
| 11,074,126 B2 | 7/2021 | Prather et al. |
| 11,088,710 B2 | 8/2021 | Lee et al. |
| 11,200,961 B1 * | 12/2021 | Uribe .................... G11C 29/44 |
| 11,264,085 B1 | 3/2022 | Ware et al. |
| 11,538,515 B2 | 12/2022 | Ji et al. |
| 11,579,971 B2 | 2/2023 | Ayyapureddi |
| 11,615,861 B2 | 3/2023 | Kim et al. |
| 12,001,707 B2 | 6/2024 | Boehm et al. |
| 12,014,797 B2 | 6/2024 | Ayyapureddi |
| 12,019,513 B2 | 6/2024 | Ayyapureddi |
| 12,204,410 B2 | 1/2025 | Sutera et al. |
| 12,204,770 B2 | 1/2025 | Ayyapureddi |
| 12,230,347 B2 | 2/2025 | Suh et al. |
| 12,249,393 B2 | 3/2025 | Reohr |
| 2003/0081492 A1 | 5/2003 | Farrell et al. |
| 2006/0233030 A1 | 10/2006 | Choi |
| 2008/0089129 A1 | 4/2008 | Lee |
| 2008/0313493 A1 | 12/2008 | Roohparvar et al. |
| 2009/0097348 A1 | 4/2009 | Minzoni et al. |
| 2009/0132876 A1 | 5/2009 | Freking et al. |
| 2009/0168523 A1 | 7/2009 | Shirakawa et al. |
| 2009/0196103 A1 | 8/2009 | Kim et al. |
| 2010/0177582 A1 | 7/2010 | Kim et al. |
| 2010/0177587 A1 | 7/2010 | Huang |
| 2010/0290146 A1 | 11/2010 | Lam |
| 2011/0154158 A1 | 6/2011 | Yurzola et al. |
| 2013/0117630 A1 | 5/2013 | Kang |
| 2014/0126300 A1 | 5/2014 | Takahashi et al. |
| 2015/0193464 A1 | 7/2015 | Kwon et al. |
| 2015/0262631 A1 | 9/2015 | Shimizu |
| 2016/0070507 A1 | 3/2016 | Hoshikawa et al. |
| 2016/0092307 A1 | 3/2016 | Bonen et al. |
| 2016/0125920 A1 | 5/2016 | Kim et al. |
| 2016/0307645 A1 | 10/2016 | Kim et al. |
| 2017/0060681 A1 | 3/2017 | Halbert et al. |
| 2017/0062067 A1 | 3/2017 | Yang et al. |
| 2017/0091025 A1 | 3/2017 | Ahn et al. |
| 2017/0192843 A1 | 7/2017 | Warnes et al. |
| 2017/0249097 A1 | 8/2017 | Eguchi |
| 2017/0269992 A1 | 9/2017 | Bandic et al. |
| 2017/0285990 A1 | 10/2017 | Chen et al. |
| 2017/0286213 A1 | 10/2017 | Li |
| 2017/0344423 A1 | 11/2017 | Hsiao et al. |
| 2018/0025760 A1 | 1/2018 | Mazumder et al. |
| 2018/0121283 A1 | 5/2018 | Plants |
| 2018/0150350 A1 | 5/2018 | Cha et al. |
| 2019/0066816 A1 | 2/2019 | Dono |
| 2019/0103154 A1 | 4/2019 | Cox et al. |
| 2019/0197171 A1 | 6/2019 | Tiwari et al. |
| 2019/0206478 A1 | 7/2019 | Jun |
| 2019/0362792 A1 | 11/2019 | Oh et al. |
| 2019/0369893 A1 | 12/2019 | Ross |
| 2020/0019462 A1 | 1/2020 | Prather et al. |
| 2020/0051616 A1 | 2/2020 | Cho |
| 2020/0104205 A1 | 4/2020 | Noguchi et al. |
| 2020/0104208 A1 | 4/2020 | Heo et al. |
| 2020/0194050 A1 | 6/2020 | Akamatsu |
| 2020/0226039 A1 | 7/2020 | Lee |
| 2020/0373941 A1 | 11/2020 | Latorre et al. |
| 2021/0011645 A1 | 1/2021 | Martinelli et al. |
| 2021/0012817 A1 | 1/2021 | Laurent et al. |
| 2021/0012849 A1 | 1/2021 | Kim et al. |
| 2021/0057003 A1 | 2/2021 | Prather et al. |
| 2021/0064119 A1 | 3/2021 | Mirichigni et al. |
| 2021/0064282 A1 | 3/2021 | He et al. |
| 2021/0064461 A1 | 3/2021 | Veches |
| 2021/0064467 A1 | 3/2021 | Buerkle et al. |
| 2021/0083687 A1 * | 3/2021 | Lee ...................... H03M 13/116 |
| 2021/0142848 A1 | 5/2021 | Lim et al. |
| 2021/0142860 A1 | 5/2021 | Song et al. |
| 2021/0200630 A1 | 7/2021 | Ishikawa et al. |
| 2021/0208967 A1 | 7/2021 | Cha et al. |
| 2021/0224155 A1 * | 7/2021 | Bains .................. G06F 11/1048 |
| 2021/0247910 A1 | 8/2021 | Kim et al. |
| 2021/0272627 A1 | 9/2021 | Lee |
| 2021/0294692 A1 | 9/2021 | Chen |
| 2021/0311821 A1 | 10/2021 | Ryu et al. |
| 2021/0311822 A1 | 10/2021 | Jannusch et al. |
| 2021/0311830 A1 | 10/2021 | Lee |
| 2021/0357287 A1 | 11/2021 | Kim et al. |
| 2021/0358559 A1 | 11/2021 | Suh et al. |
| 2021/0365316 A1 | 11/2021 | Nale et al. |
| 2021/0406123 A1 | 12/2021 | Nakanishi et al. |
| 2022/0027090 A1 | 1/2022 | Kwon et al. |
| 2022/0035529 A1 | 2/2022 | Bennett |
| 2022/0084565 A1 | 3/2022 | Prather et al. |
| 2022/0091938 A1 | 3/2022 | Buerkle et al. |
| 2022/0129196 A1 | 4/2022 | Roberts et al. |
| 2022/0138065 A1 | 5/2022 | Secatch et al. |
| 2022/0197739 A1 | 6/2022 | Ryu et al. |
| 2022/0261310 A1 | 8/2022 | Ishikawa et al. |
| 2022/0334917 A1 | 10/2022 | Veches |
| 2022/0337271 A1 | 10/2022 | Hanna |
| 2022/0365692 A1 | 11/2022 | Vankamamidi et al. |
| 2022/0398042 A1 | 12/2022 | Song et al. |
| 2022/0415398 A1 | 12/2022 | Lien et al. |
| 2023/0146549 A1 | 5/2023 | Lien et al. |
| 2023/0161665 A1 | 5/2023 | Choi et al. |
| 2023/0185665 A1 | 6/2023 | Ayyapureddi |
| 2023/0223096 A1 | 7/2023 | Bains et al. |
| 2023/0289072 A1 | 9/2023 | Cho et al. |
| 2023/0298682 A1 | 9/2023 | Suh et al. |
| 2023/0350581 A1 | 11/2023 | Ayyapureddi |
| 2023/0350748 A1 | 11/2023 | Ayyapureddi |
| 2023/0352064 A1 | 11/2023 | Ayyapureddi |
| 2023/0352112 A1 | 11/2023 | Ayyapureddi |
| 2024/0079074 A1 | 3/2024 | Bak et al. |
| 2024/0086520 A1 | 3/2024 | Kaplan et al. |
| 2024/0096404 A1 | 3/2024 | Cho et al. |
| 2024/0126438 A1 | 4/2024 | Suh et al. |
| 2024/0160351 A1 | 5/2024 | Ayyapureddi et al. |
| 2024/0160524 A1 | 5/2024 | Ayyapureddi et al. |
| 2024/0160527 A1 | 5/2024 | Ayyapureddi et al. |
| 2024/0161855 A1 * | 5/2024 | Smith .................... G11C 29/42 |
| 2024/0161856 A1 * | 5/2024 | Smith ..................... G11C 7/12 |
| 2024/0161859 A1 | 5/2024 | Ayyapureddi et al. |
| 2024/0176699 A1 | 5/2024 | Ayyapureddi et al. |
| 2024/0177794 A1 | 5/2024 | Vogelsang |
| 2024/0248796 A1 | 7/2024 | Ayyapureddi |
| 2024/0256380 A1 | 8/2024 | Ayyapureddi |
| 2024/0256382 A1 | 8/2024 | Ayyapureddi |
| 2024/0272979 A1 | 8/2024 | Ayyapureddi |
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0281327 A1 | 8/2024 | Ayyapureddi et al. |
| 2024/0289266 A1 | 8/2024 | Ayyapureddi |
| 2024/0321328 A1 | 9/2024 | Ayyapureddi |
| 2024/0377952 A1 | 11/2024 | Song et al. |

(56) References Cited

U.S. PATENT DOCUMENTS

| | | |
|---|---|---|
| 2024/0394178 A1 | 11/2024 | Partsch |
| 2024/0419538 A1 | 12/2024 | Huang et al. |
| 2025/0077103 A1 | 3/2025 | Ayyapureddi |
| 2025/0077424 A1 | 3/2025 | Ayyapureddi |
| 2025/0078906 A1 | 3/2025 | Kim et al. |
| 2025/0078949 A1 | 3/2025 | Ayyapureddi |
| 2025/0078950 A1 | 3/2025 | Ayyapureddi |
| 2025/0110643 A1 | 4/2025 | Ayyapureddi |
| 2025/0110825 A1 | 4/2025 | Ayyapureddi |
| 2025/0110830 A1 | 4/2025 | Ayyapureddi |
| 2025/0111887 A1 | 4/2025 | Ayyapureddi |
| 2025/0112643 A1 | 4/2025 | Ayyapureddi |
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |

FOREIGN PATENT DOCUMENTS

| | | |
|---|---|---|
| WO | 2024107503 A1 | 5/2024 |
| WO | 2024107504 A1 | 5/2024 |
| WO | 2024167711 A1 | 8/2024 |
| WO | 2025053912 A1 | 3/2025 |
| WO | 2025075696 A1 | 4/2025 |
| WO | 2025075697 A1 | 4/2025 |

OTHER PUBLICATIONS

U.S. Appl. No. 18/743,994 titled "Apparatuses and Methods for Shared Codeword in 2-Pass Access Operations" filed Jun. 14, 2024, pp. all pages of the application as filed.
U.S. Appl. No. 18/745,577 titled "Apparatuses and Methods for Half-Page Modes of Memory Devices" filed Jun. 17, 2024, pp. all pages of the application as filed.
U.S. Appl. No. 18/745,843 titled "Apparatuses and Methods for Half-Page Modes of Memory Devices" filed Jun. 17, 2024, pp. all pages of the application as filed.
U.S. Appl. No. 18/745,877 titled "Apparatuses and Methods for Half-Page Modes of Memory Devices" filed Jun. 17, 2024, pp. all pages of the application as filed.
U.S. Appl. No. 18/745,894 titled "Apparatuses and Methods for Half-Page Modes of Memory Devices" filed Jun. 17, 2024, pp. all pages of the application as filed.
U.S. Appl. No. 18/747,658, titled "Apparatuses and Methods for Bounded Fault Compliant Metadata Storage" filed, pp. all pages of application as filed.
U.S. Appl. No. 18/747,676, titled "Apparatuses and Methods for Alternate Memory Die Metadata Storage", filed Jun. 19, 2024, pp. all pages of application as filed.
U.S. Appl. No. 18/747,696, titled "Apparatuses and Methods for Scalable 1-Pass Error Correction Code Operations", filed Jun. 19, 2024, pp. all pages of application as filed.
U.S. Appl. No. 18/747,712, titled "Apparatuses and Methods for Granular Single-Pass Metadata Access Operations" filed Jun. 19, 2024, pp. all pages of application as filed.
U.S. Appl. No. 18/747,635, titled "Apparatuses and Methods for Read/Modify/Write Single-Pass Metadata Access Operations" filed Jun. 19, 2024, pp. all pages of application as filed.
PCT Application No. PCT/US24/39192 titled "Apparatuses and Methods for Scalable 1-Pass Error Correction Code Operations" filed Jul. 23, 2024, pp. all pages of the application as filed.
PCT Application No. PCT/US24/39195 titled "Apparatuses and Methods for Half-Page Modes of Memory Devices" filed Jul. 23, 2024, pp. all pages of the application as filed.
PCT Application No. PCT/US24/39231 titled "Apparatuses and Methods for Granular Single-Pass Metadata Access Operations" filed Jul. 24, 2024, pp. all pages of the application as filed.
PCT Application No. PCT/US23/76430 titled "Apparatuses and Methods for Separate Write Enable for Single-Pass Access of Data, Metadata, and Parity Information" filed Oct. 10, 2023, pp. all pages of application as filed.
PCT Application No. PCT/US23/76433 titled "Apparatuses and Methods for Single-Pass Access of ECC Information, Metadata Information or Combinations Thereof" filed Oct. 10, 2023; pp. all pages of application as filed.
PCT Application No. PCT/US24/13516, titled "Apparatuses, Systems, and Methods for Storing Memory Metadata" filed Jan. 30, 2024; pp. all pages of application as filed.
U.S. Appl. No. 17/730,381, titled "Apparatuses, Systems, and Methods for Per Row Error Scrub Information", filed Apr. 27, 2022; pp. all pages of application as filed.
U.S. Appl. No. 17/731,024, titled "Apparatuses, Systems, and Methods for Managing Metadata Storage At a Memory", filed Apr. 27, 2022; pp. all pages of the application as filed.
U.S. Appl. No. 18/424,282 titled "Apparatuses and Methods for Bounded Fault Compliant Metadata Storage" filed Jan. 26, 2024; pp. all pages of application as filed.
U.S. Appl. No. 18/424,342 titled "Apparatuses and Methods for Bounded Fault Compliant Metadata Storage" filed Jan. 26, 2024; pp. all pages of application as filed.
U.S. Appl. No. 18/430,381, titled "Apparatuses, Systems, and Methods for Storing Memory Metadata", filed Feb. 1, 2024; pp. all pages of application as filed.
U.S. Appl. No. 18/430,406, titled "Apparatuses, Systems, and Methods for Storing Memory Metadata", filed Feb. 1, 2024; pp. all pages of application as filed.
U.S. Appl. No. 18/431,232, titled "Apparatuses, Systems, and Methods for Storing Memory Metadata", filed Feb. 2, 2024; pp. all pages of application as filed.
U.S. Appl. No. 18/431,306, titled "Apparatuses, Systems, and Methods for Storing Memory Metadata", filed Feb. 2, 2024; pp. all pages of application as filed.
U.S. Appl. No. 18/504,215 titled "Apparatuses and Methods for Enhanced Metadata Support" filed Nov. 8, 2023; pp. all pages of application as filed.
U.S. Appl. No. 18/504,234 titled "Apparatuses and Methods for Enhanced Metadata Support" filed Nov. 8, 2023; pp. all pages of application as filed.
U.S. Appl. No. 18/504,316 titled "Apparatuses and Methods for Configurable ECC Modes" filed Nov. 8, 2023; all pages of application as filed.
U.S. Appl. No. 18/504,324 titled "Apparatuses and Methods for Single-Pass Access of ECC Information, Metadata Information or Combinations Thereof", filed Nov. 8, 2023, all pages of application as filed.
U.S. Appl. No. 18/504,342 titled "Apparatuses and Methods for Single-Pass Access of ECC Information, Metadata Information or Combinations Thereof" filed Nov. 8, 2023; pp. all pages of application as filed.
U.S. Appl. No. 18/504,353 titled "Apparatuses and Methods for Separate Write Enable for Single-Pass Accessof Data, Metadata, and Parity Information" filed Nov. 8, 2023; pp. all pages of application as filed.
U.S. Appl. No. 18/504,362 titled "Apparatuses and Methods for Separate Write Enable for Single-Pass Access of Data, Metadata, and Parity Information" filed Nov. 8, 2023; pp. all pages of application as filed.
U.S. Appl. No. 17/730,396, titled "Apparatuses, Systems, and Methods for Per Row Error Scrub Information Registers", filed Apr. 27, 2022; pp. all pages of application as filed.
U.S. Appl. No. 17/730,992 titled "Mode Register for Blocking Direct Access To Meta Data" filed Apr. 27, 2022, pp. all pages of application as filed.
U.S. Appl. No. 17/731,024 titled "Apparatuses, Systems, and Methods for Managing Metadata Storage At a Memory" filed Apr. 27, 2022, Kne.
U.S. Appl. No. 17/730,992 titled "Apparatuses, Systems, and Methods for Managing Metadata Security and Access" filed Apr. 27, 2022, Kne.
U.S. Appl. No. 18/441,775 titled "Apparatuses and Methods for Settings for Adjustable Write Timing" filed Feb. 14, 2024, pp. all pages of the application as filed.

(56) References Cited

OTHER PUBLICATIONS

U.S. Appl. No. 18/441,830 titled "Apparatuses, Systems, and Methods for Storing and Accessing Memory Metadata and Error Correction Code Data" filed Feb. 14, 2024, pp. all pages of the application as filed.
U.S. Appl. No. 18/625,539, titled "Apparatuses, Systems, and Methods for Per Row Error Scrub Information" filed Apr. 3, 2024, upp. all pages of application as filed.
U.S. Appl. No. 19/025,934, titled "Apparatuses, Systems, and Methods for Managing Metadata Security and Access" filed Jan. 16, 2025, pp. all pages of application as filed.
Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.
J. F. Philippe Marchand "An Alterable Programmable Logic Array"; IEEE Journal of Solid-State Circuits, vol. sc-20, No. 5, Oct. 1985; pp. 1061-1066.
Lumenci Team "High Bandwidth Memory (HBM3)" https://lumenci.com/blogs/high-bandwidth-memory; Editorial Team at Lumenci, Jul. 14, 2022; pp. 1-3.

\* cited by examiner

APPARATUSES AND METHODS FOR CONFIGURABLE ECC MODES

CROSS REFERENCE TO RELATED APPLICATION(S)

This application claims the benefit under 35 U.S.C. § 119 of the earlier filing date of U.S. Provisional Application Ser. No. 63/383,865 filed Nov. 15, 2022 the entire contents of which are hereby incorporated by reference in their entirety for any purpose.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed.

There is a growing interest in enabling the memory to store information in the array which is associated with pieces of data. For example, error correction information may be stored in the array along with their associated data. There may be a need to ensure that such information can be accessed along with the specified data without unduly impacting the performance of the semiconductor device.

DETAILED DESCRIPTION

Figure 1:
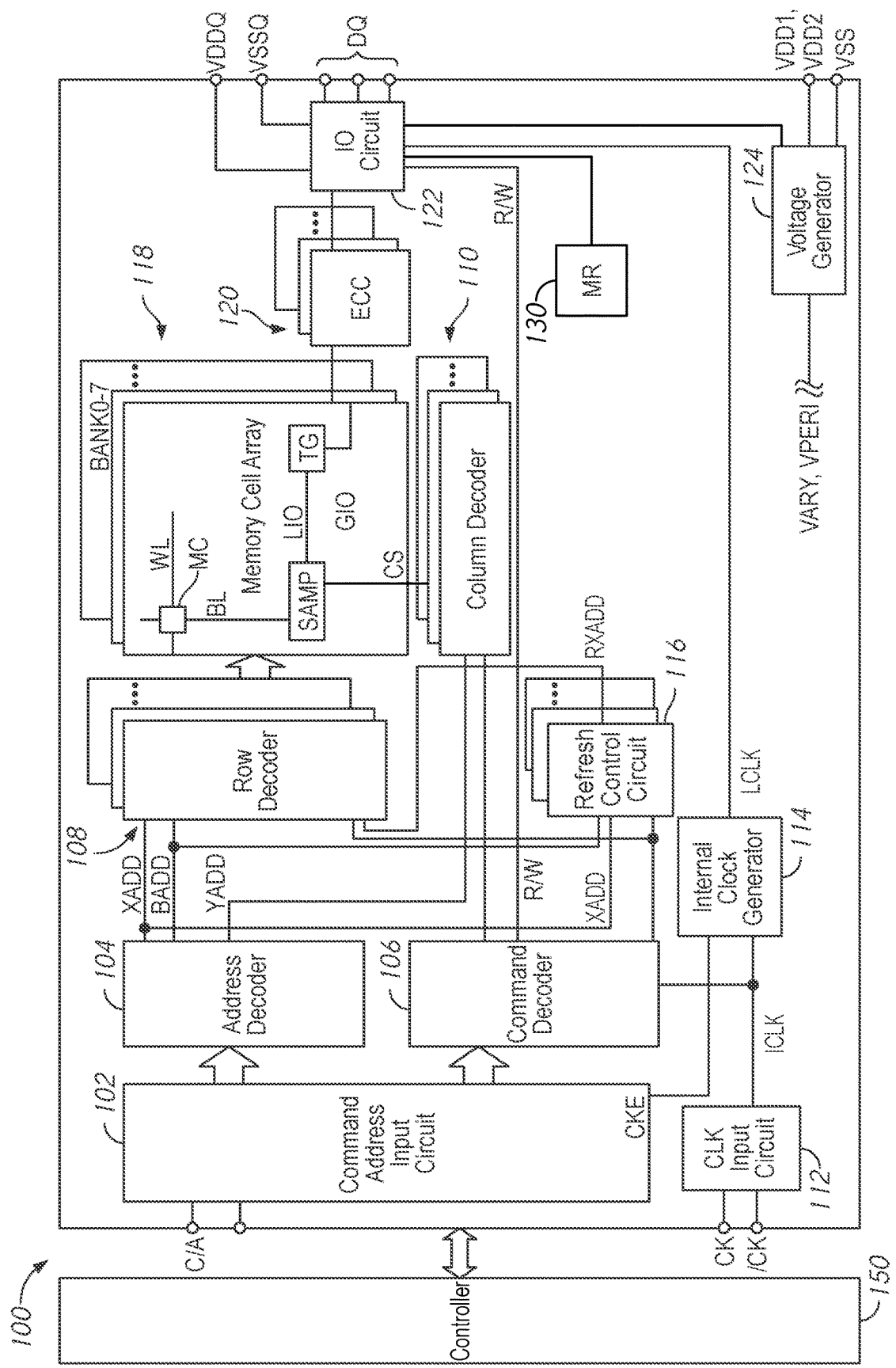
FIG. 1 is a block diagram of a semiconductor device according an embodiment of the disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. When an access command is received, the memory may prefetch a codeword (e.g., a number of bits of data) along with one or more associated bits from the memory and either replace the prefetched data with new data (e.g., as part of a write operation) or provide the prefetched data off the memory device (e.g., as part of a read operation). Some memory modes may involve providing less than all of the prefetched data off the memory device. For example, in a conventional memory device, in certain modes half of the prefetched data may be provided off the device, and the remainder may be ignored.

Memory devices may store additional information which is associated with each codeword. For example, the additional information may include parity bits which are used as part of an error correction scheme. However, the maximum number of bits that can be retrieved as part of a single access pass may be limited by the architecture of the memory, and this number may generally be based on a maximum number of data bits in the codeword plus some number of additional bits (e.g., 128 data bits+8 additional bits). Some memories may include a set of data column planes, plus an extra column plane that stores additional information. However, it may be desirable to include a greater number of bits additional information than can be retrieved from the extra column plane for various applications (e.g., to include a lower data bit to parity bit ratio, etc.). Some memory devices may use a 'two-pass' architecture, where at least some of the additional bits are retrieved first, stored, and then a second access pass retrieves the codeword data bits. However, this may incur a penalty to the latency of any given access operation. A one-pass or single-pass architecture for storage of extended additional information, such that the codeword and the additional bits are retrieved as part of a single access pass to the memory array, may provide performance benefits over the two-pass architecture.

As used herein, the term data may represent any bits of information that the controller wishes to store and/or retrieve from the memory. The data represents information written to the memory by a controller and then also read from the memory by the controller. The term parity may represent any bits generated by an error correction circuit of the memory based on the data, metadata, or combinations thereof. The parity may generally stay within the memory. In some embodiments, the amount of data retrieved as part of a single access operation may represent a set of bits which are a fragment of a larger piece of information. For example, the data bits retrieved as part of a single access operation (e.g., 64 bits) may not have any meaning on their own, but may have meaning when combined with sets of data bits retrieved as part of other access operations (e.g., to other memory arrays and/or to the same array at different times).

The present disclosure is drawn to apparatuses, systems, and methods for single-pass access of ECC information from one of an extra column plane or a data column plane with the associated codeword to, for example, enable single error correction (SEC) double error detection (DED). Some memory devices may operate in mode where fewer than all of the data bits that can be prefetched are provided off the device. For example, a memory device may prefetch 128 data bits as part of a codeword in an x8 or x16 mode, however in an x4 memory mode, a 64 bit codeword is provided at data terminals of the device. The data bits of the codeword in the x4 memory mode are stored in some, but not all of the data column planes (e.g., half of the column planes). The half of the data column planes may be selected may be based on the column address. Additional bits (e.g., parity bits) associated with the data may be stored both in the extra column plane, and also in data column planes that are not selected by the column address as part of the current access.

According to some embodiments of the current disclosure, an example memory device may include a set of data column planes and an extra column plane. The memory may be set in a mode that enables SECDED by storing some of the ECC data in data column planes along with its associated data and storing some ECC data in the extra column plane. SECDED requires a lower ratio of codeword bits to ECC bits. That is, 8 ECC parity bits per 128 bits of data may only be capable of single error detection (SED) within the data. Whereas, 8 parity bits per 64 bits of data may enable SECDED. In some examples, the extra column plane may be smaller than a data column plane, and as such, may be incapable of storing a sufficient number of ECC bits for every column address access to enable SECDED for 64 bit codeword architectures.

To provide extra ECC storage, some ECC data may be stored in the data column planes. When an access operation is performed, a column select signal with a first value is provided to columns in a first portion of the data column planes and to the extra column plane and a column select signal with a second value is provided to one or more columns not in the first portion of the data column planes. The memory may store data in the first portion of the data column planes, and may store ECC data in the extra column plane and/or in the accessed columns that are not in the first portion of the data column planes. In this way, the data for the codeword and the ECC information may be prefetched together as part of a single access pass, without prefetching additional data bits to facilitate SECDED ECC operation.

In some embodiments, a mode register may be used toggle between behaviors of the memory device. For example, if Enhanced ECC mode is disabled (e.g., SEC enabled), the memory may have a first x4 operational mode where the memory may store data bits at the first portion of the data column planes and the second portion of the data column planes, and prefetch ECC parity information from the extra column plane. In this x4 operational mode, an ECC circuit of the memory may correct single bit errors in the prefetched data bits based on the prefetched parity bits, and then provide data bits (e.g., the bits from the first portion) off the memory.

When Enhanced ECC is enabled (e.g., SECDED is enabled), as part of an access operation, the memory may prefetch data bits from a first portion of the data column planes and ECC parity bits from one of the extra column plane or from a column plane in a second portion of the data column planes (e.g., determined based on the column address. The ECC circuit may correct errors in the data based on the parity bits, and the corrected data may be transmitted from the device. Accordingly fewer bits may be prefetched and processed by the ECC in the second mode (e.g., SECDED enabled mode) than in the first mode (e.g., SEC enabled mode). SECDED is made possible in the second mode via the lower codeword bit to parity bit ratio.

FIG. 1 is a block diagram of a semiconductor device according an embodiment of the disclosure. The semiconductor device 100 may be a semiconductor memory device, such as a DRAM device integrated on a single semiconductor chip. The device may be operated by a controller 150, such as a processor.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. As explained in more detail herein, each bank may be further divided into two or more sub-banks. While embodiments where each bank includes two sub-banks are generally described herein, other embodiments may include more sub-banks per bank.

Each memory sub-bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. In some embodiments, components such as the row and column decoders and refresh control circuit 116 which are repeated on a per-bank basis may also include components which are repeated on a per-sub-bank basis. For example, there may be a refresh control circuit 116 for each sub-bank.

The bit lines BL are coupled to a respective sense amplifier (SAMP). Read data from the bit line BL is amplified by the sense amplifier SAMP, and transferred to an ECC circuit 120 over local data lines (LIO), transfer gate (TG), and global data lines (GIO). Conversely, write data outputted from the ECC circuit 120 is transferred to the sense amplifier SAMP over the complementary main data lines GIO, the transfer gate TG, and the complementary local data lines LIO, and written in the memory cell MC coupled to the bit line BL.

The semiconductor device 100 may employ a plurality of external terminals, such as solder pads, that include command and address (C/A) terminals coupled to a command and address bus to receive commands and addresses, clock terminals to receive clocks CK and /CK, data terminals DQ coupled to a data bus to provide data, and power supply terminals to receive power supply potentials VDD, VSS, VDDQ, and VSSQ.

The clock terminals are supplied with external clocks CK and /CK that are provided to an input circuit 112. The external clocks may be complementary. The input circuit 112 generates an internal clock ICLK based on the CK and /CK clocks. The ICLK clock is provided to the command decoder 106 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data. The input/output circuit 122 may include a number of interface connections, each of which may be couple-able to one of the DQ pads (e.g., the solder pads which may act as external connections to the device 100).

The C/A terminals may be supplied with memory addresses. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The decoded row address XADD may be used to determine which row should be opened, which may cause the data along the bit lines to be read out along the bit lines. The column decoder 110 may provide a column select signal CS, which may be used to determine which sense amplifiers provide data to the LIO. The address decoder 104 may also supply a decoded bank address BADD, which may indicate the bank of the memory array 118 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide signals which indicate if data is to be read, written, etc.

The device 100 may receive an access command which is a read command. When a read command is received, and a bank address, a row address and a column address are timely supplied with the read command, read data is read from memory cells in the memory array 118 corresponding to the row address and column address. The read command is received by the command decoder 106, which provides internal commands so that read data from the memory array 118 is provided to the ECC circuit 120. The ECC circuit 120 receives data bits and parity bits from the memory array 118 and detects and/or corrects errors in the data bits. The correct read data is provided along the data bus and output to outside from the data terminals DQ via the input/output circuit 122.

The device 100 may receive an access command which is a write command. When the write command is received, and a bank address, a row address and a column address are timely supplied with the write command, write data supplied to the data terminals DQ is provided along the data bus and written to a memory cells in the memory array 118 corresponding to the row address and column address. The write command is received by the command decoder 106, which provides internal commands so that the write data is received by data receivers in the input/output circuit 122. The write data is supplied via the input/output circuit 122 to the ECC circuit 120. The ECC circuit generates parity bits based on the received data and the received data and parity are provided by the ECC circuit 120 to the memory array 118 to be written into the memory cell MC.

The device 100 includes refresh control circuits 116 each associated with a bank of the memory array 118. Each refresh control circuit 116 may determine when to perform a refresh operation on the associated bank. The refresh control circuit 116 provides a refresh address RXADD (along with one or more refresh signals, not shown in FIG. 1). The row decoder 108 performs a refresh operation on one or more word lines associated with RXADD. The refresh control circuit 116 may perform multiple types of refresh operation, which may determine how the address RXADD is generated, as well as other details such as how many word lines are associated with the address RXADD.

The ECC circuit 120 may detect and/or correct errors in the accessed data. As part of a write operation, the ECC circuit 120 may receive bits from the IO circuit 122 and generate parity bits based on those received bits. The received bits and parity bits are written to the memory array 118. During an example read operation, the ECC circuit 120 receives a set of bits and their associated parity bits from the array 118 and uses them to locate and/or correct errors. For example, in a single error correction (SEC) scheme, up to one bit of error may be located and detected. In a single error correction, double error detection (SECDED) scheme, up to one bit of error may be corrected, but two errors may be detected (although the bits causing those errors are not individually located, so no correction can be made). The ECC circuit 120 may correct the information and then provide the corrected information (and/or a signal indicated detected errors) to the IO circuit 122. The parity bits may generally not be provided to the IO circuit 122.

The mode register 130 may include various settings, and may be used to enable an enhanced ECC mode of the memory 100. When the enhanced ECC mode is enabled, the device 100 may store ECC data associated with the data in either an extra column plane or a designated data column plane determined based on the column address.

The memory 100 may be operated in various modes based on a number of the DQ pads which are used. The mode may determine both how many DQ pads the controller 150 expects to send/receive data along, as well as the format and/or number of bits which the controller 150 expects as part of a single access command. For example, the memory may have 16 physical DQ pads. In an x16 mode, all 16 DQ pads are used. In an x8 mode eight of the DQ pads are used, and in an x4 mode, four of the DQ pads are used. The mode may also determine a burst length at each DQ terminal as part of a DQ operation. The burst length represents a number of serial bits at each DQ terminal during an access operation.

For example, an x8 mode, the memory may send or receive 128 data bits along 8 DQ terminals, each of which has a burst length of 16. In an example x4 mode, a burst length of 16 may also be used, and thus 64 bits may be sent or received as part of the access operation. The present disclosure will generally be described with respect to an example embodiment where as part of an x4 mode a codeword of 64 data bits is accessed, and the ECC circuit 120 uses 8 bits of ECC parity. Other example embodiments may use different numbers of data and parity.

The device 100 includes a mode register 130 that may be used to control various optional modes of the memory. For example, the mode register 130 may include a setting which determines if an enhanced ECC mode is enabled or not. If the enhanced ECC mode is enabled, the mode register 130 may set a one-pass x4 operational mode. The controller 150 may perform a mode register write (MRW) operation to set values in the mode register 130, or may perform a mode register read (MRR) operation to check what values in the mode register 130 are. The mode register 130 includes a number of registers, each of which may store one or more bits which correspond to a setting or piece of information about the memory.

The controller 150 may provide a command as well as row and column addresses as part of an access operation. In the x4 operational mode, responsive to addresses and a read command, the memory may retrieve the data and parity as part of a single access pass on the memory array.

The power supply terminals are supplied with power supply potentials VDD and VSS. The power supply potentials VDD and VSS are supplied to an internal voltage generator circuit 124. The internal voltage generator circuit 124 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
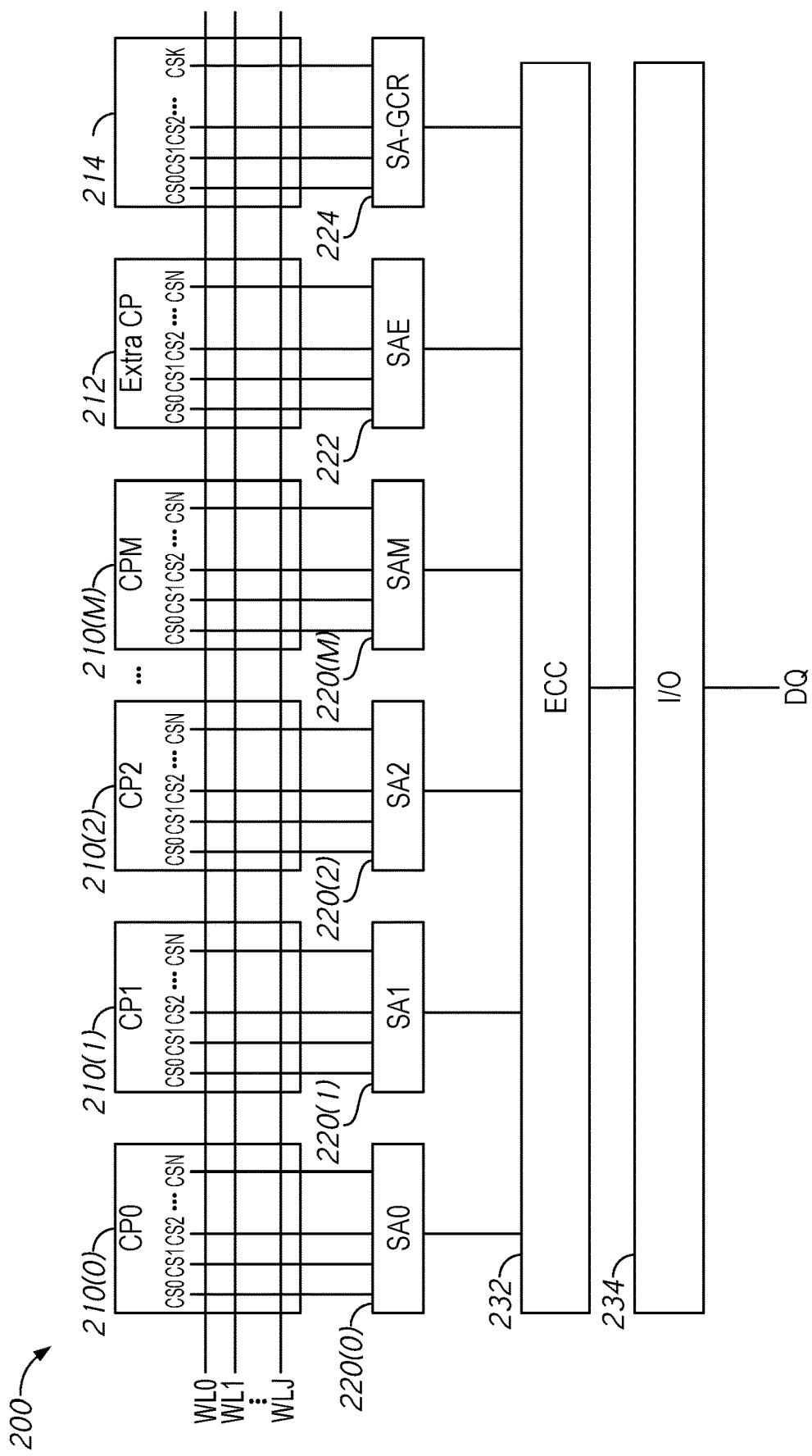
FIG. 2 is a block diagram of a memory device according to some embodiments of the present disclosure.

FIG. 2 is a block diagram of a memory device according to some embodiments of the present disclosure. The memory device 200 may, in some embodiments, represent a portion of the memory device 100 of FIG. 1. The view of FIG. 2 shows a portion of a memory array 210-214 and 220-224 which may be part of a memory bank (e.g., BANK0-7 of the memory array 118 of FIG. 1) along with selected circuits used in the data path such as the ECC circuit 232 (e.g., 120 of FIG. 1) and IO circuits 234 (e.g., 122 of FIG. 1). For clarity certain circuits and signals have been omitted from the view of FIG. 2.

The memory device 200 is organized into a number of column planes 210-214. Each of the column planes represents a portion of a memory bank. Each column plane 210-214 includes a number of memory cells at the intersection of word lines WL and bit lines. The bit lines may be grouped together into sets which are activated by a value of a CS signal. For the sake of clarity, only a single vertical line is used to represent the bit lines of each column select set, however, there may be multiple columns accessed by that value of CS. For example, each line may represent 8 bit lines, all accessed in common by a value of CS. As used herein, a 'value' of CS may refer to a decoded signal provided to sets of bit lines. So a first value may represent a first value of a multibit CS signal, or after decoding a signal line associated with that value being active. The wordlines may be extend across multiple of the column planes 210-214.

The memory 200 includes a set of data column planes 210, as well as an extra column plane 212. The extra column plane 212 may be used to store additional information, such as ECC parity bits.

In some embodiments, the memory 200 may also include an optional global column redundancy (GCR) column plane 214. In some embodiments, the GCR plane 214 may have fewer memory cell (e.g., fewer column select groups) than the data column planes 210. The GCR CP 214 includes a number of redundant columns which may be used as part of a repair operation. If a value of the CS signal is identified as including defective memory cells in one of the data column planes 210, then the memory may be remapped such that the data which would have been stored in that column plane for that value of CS is instead stored in the GCR CP 214.

For example, in some embodiments the memory 210 may include 16 data column planes 210(0)-210(15). Each of those data column planes 210 includes 64 sets of bit lines activated by a value of the column select signal, and each set of bit lines includes 8 bit lines. Accordingly, when a word line is opened responsive to a row address, and a column select signal is provided to each of the 16 column planes then 8 bits are accessed from each of the 16 column planes for a total of 128 bits. A column select signal is also provided to the extra column plane 212, although that column select signal may be a different value than the one provided to the data column planes 210 for an additional 8 bits. If a repair has been performed, the GCR CP 214 may also be accessed and the value on a GCR LIO may be used while ignoring the LIO of the column plane it is replacing. Accordingly, the maximum number of bits that can be retrieved as part of an access pass is 128 bits from the data column planes 210 (with 8 bits substituted from the GCR CP 214 if there has been a repair) along with 8 additional bits from the extra CP 212.

The memory may be operated in an x4 mode, where fewer than the maximum number of bits are provided to an external device. The column address may indicate which of the column planes 210(0)-(M) are used to store the data accessed in a x4 mode. For example, a CP select bit of the column address (e.g., a $10^{th}$ bit of the column address, C10) may select data from even column planes or odd column planes or from a first half of the column planes or a second half of the column planes. Other schemes may be used in other example embodiments.

A mode register (e.g., the mode register 130 of FIG. 1), not shown in FIG. 2, may be used to enable enhanced ECC on the device. If enhanced ECC is disabled, then ECC data is limited to data in the extra column plane 212. If enhanced ECC is enabled, the mode register may have settings that put the memory device in a one-pass x4 operational mode, and facilitate storage of some additional ECC data in two or more of the column planes 210(0)-(M). In both operational modes, the overall information received from/sent to an external device is the same. For example, a controller (e.g., 150 of FIG. 1) of the memory may expect 64 data bits for each access of the memory 200 in either mode, however, the operational modes may determine how the memory array is accessed, the power consumption of the access operation, the size of the prefetched information, the behavior of the ECC circuit 232, and which information is stored in what column planes 210(0)-(M).

In an example read command in the enhanced ECC operational mode, a column, row and bank address are received from the controller. A row decoder (e.g., the row decoder 108 of FIG. 1) opens a selected word line based on the row address. The column decoder generates column select signals based on the column address. As part of a single access pass, a column select value with a first value is provided to a first portion of the column planes, and a column select signal with a second value may be provided to at least one column plane not in the first portion of column planes. Along with that a third column select signal (which may or may not have the same value of the first or the second column select signals) may be provided to the extra column plane 212. Which columns are in the first portion may be based on the CP select bit of the column address (e.g., C10). The data column planes of the first portion provide the data bits of the codeword, and one of the data column plane not in the first portion or the extra column plane 212 provides the ECC parity bits. During the enhanced ECC mode, since only a portion of the column planes 210(0)-(M) are accessed, only the number of data bits that are provided from the device are accessed (along with the ECC bits). The ECC circuit 232 receives the data along with the parity bits, and locates and/or corrects error(s) in the codeword data. The (corrected) data is provided to the IO circuit 234, which provides the data to the DQ terminals.

This one-pass, enhanced ECC mode architecture may provide a performance improvement over a two-pass architecture that requires an additional access to retrieve some of the ECC data necessary to enable SECDED ECC operation. For example, there may be a latency time tCCD_L_WR which is part of the design specification of the memory. The time tCCD_L_WR represents a minimum amount of time which must elapse before a bank group can be accessed again. The time tCCD_L_WR may be a long column-to-column) or command) delay period. During a write operation a two-pass architecture may incur a latency of 2xtCCD_L_WR since each access pass requires a delay of tCCD_L_WR before the bank can be accessed again. An additional tCCD_L_WR is incurred because in order to generate parity bits, which are based off of all of the prefetched data in the two-pass architecture, the half of the prefetched data bits which are not being written must still be prefetched (e.g., read) so that they can be added to the write bits received from the controller. The one-pass x4 operational mode may eliminate the need for the Read Modify Write since only the accessed data bits being prefetched.

In an example write command in the enhanced ECC mode, a column, row, and bank address are received from the controller along with codeword data. The codeword data are provided through the IO circuit to the ECC circuit, which generates ECC parity bits based on the codeword data and then writes the codeword data and parity to column planes accessed in a similar fashion as described with respect to the read operation.

In the enhanced ECC mode, each of the data column planes 210(0)-(M) may store a mix of data and ECC parity bits, and with additional ECC data stored in the extra column plane 212. When the enhanced ECC mode is disabled, then ECC data may be confined to the extra column plane 212. In the enhanced ECC mode, the ECC circuit 232 locates and corrects a single error and also has the ability to detect an additional error in the data. In the non-Enhanced ECC mode, the ECC circuit 232 may only correct one error in the data, since the number of parity bits may be insufficient for detecting an additional error In addition, an access in the enhanced ECC mode may draw less power than an access in the non-Enhanced ECC architecture. In the non-Enhanced ECC architecture, all of the column planes may be activated and the data read from their sense amplifiers 220 is driven along LIOs to the ECC circuit 232, along with the sense amps 222 and LIOs associated with the extra column plane 212 (and if there's been a repair the sense amps 224 and LIOs of the GCR 214). However, in the Enhanced ECC architecture, only a selected portion (e.g., half) of the data column planes 210(0)-(M) may be activated, and therefore fewer than all of the data LIOs are driven by the respective sense amplifiers 220. Similarly, various switches, signal lines, etc. may also not be used in every access of the Enhanced ECC mode. Accordingly, less power is drawn in the Enhanced ECC mode.

Figure 3:
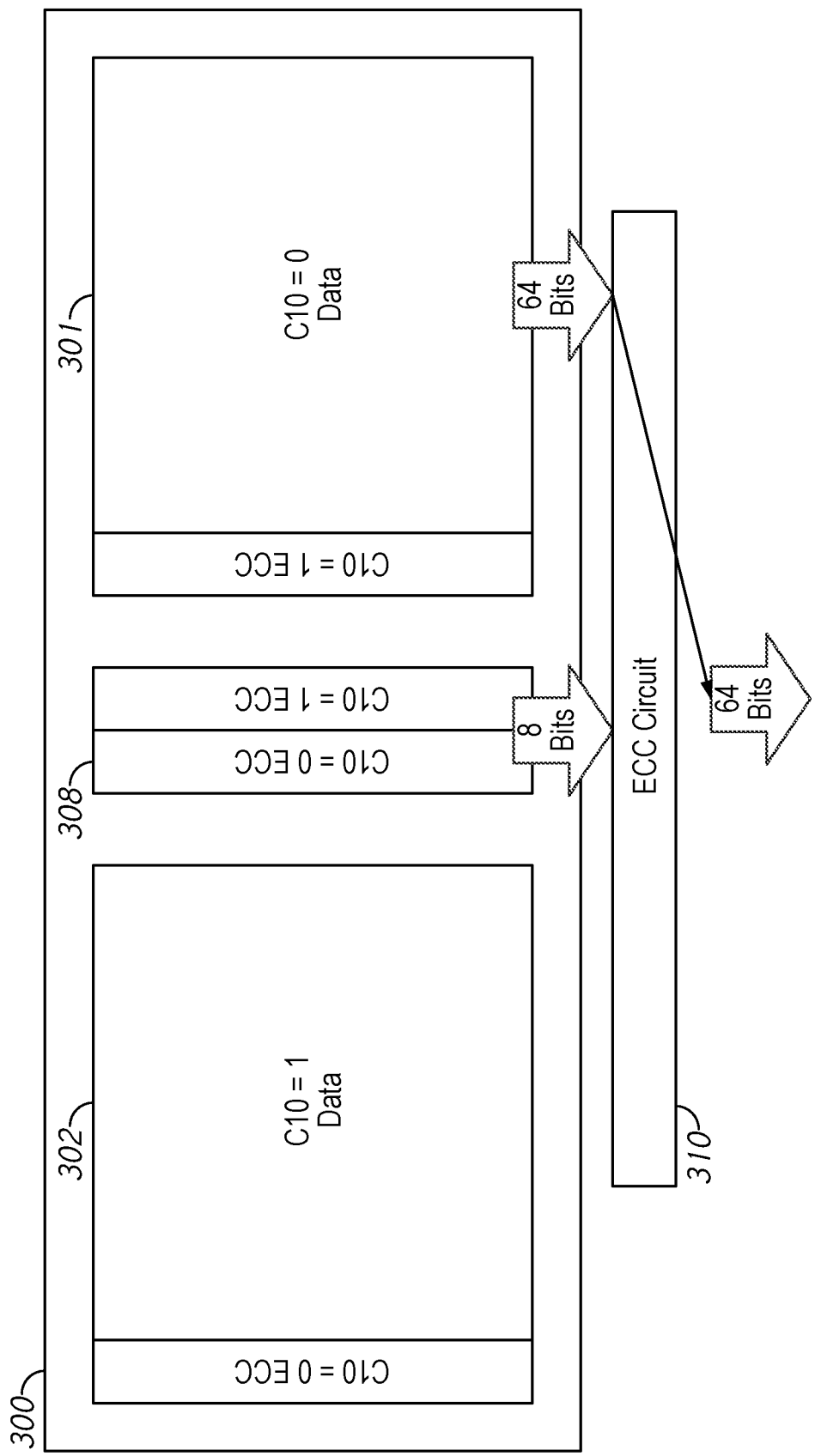
FIG. 3 is a block diagram showing an example of a read operation of a memory according to some example embodiments of the present disclosure.

FIG. 3 is a block diagram showing an example of a read operation of a memory according to some example embodiments of the present disclosure. FIG. 3 shows a view of a memory array 300 which shows a representation of what portions of the memory array are set aside for different types of information. The blocks shown in FIG. 3 represent portions of a memory array, but do not necessarily represent a spatial layout of where information is stored in the memory array. The memory array 300 may, in some embodiments, be an implementation of a memory array 118 of FIG. 1 and/or the column planes 210-214 of FIG. 2 in the Enhanced ECC operational mode as described herein.

FIG. 3 is described with respect to an example embodiment where there are 16 data column planes, each of which provides 8 bits when activated by a column select signal, and an extra column plane which also provides 8 bits when activated by its respective column select value. The example memory is operated in an x4 mode where 64 data bits are accessed by the controller (e.g., 150 of FIG. 1). A CP select bit C10 of the column address is used to determine which column planes provide the data.

During an example read operation where C10 is in a low logical state (e.g., C10=0), 8 column planes are accessed in a first portion 301 of the memory array 300, each of which provides 8 bits for a total of 64 data bits. Second column select signals are provided to a single column plane in the second portion 302 and/or to the extra column plane 308, to retrieve a total of 8 ECC parity bits. The 8 ECC parity bits may be stored exclusively in the single column plane or the extra column plane 308, in some examples. In other examples, half of the 8 parity bits may be stored exclusively in the single column plane and the other half may be stored in the extra column plane 308. In this example, the half of the bits retrieved from the extra column plane 308 used in the 8 ECC parity bits may be determined based on the C10 bit. The ECC circuit 310 (e.g., 232 of FIG. 2) receives the 64 data bits along with 8 parity bits, and provides corrected 64 data bits using SECDED.

In another example read operation where the C10 has the opposite value (e.g., C10=1) then the 64 data bits may be accessed from the second portion 302, the 8 ECC bits from the first portion 301 and/or from the extra column plane 308.

In an example write operation, when only four ECC parity bits are stored in each of the data column planes and half are stored in the extra column plane 308, the extra ECC 4 parity bits in each may be protected. For example, the memory 300 may employ a read-modify-write (or RMW) strategy where all 8 parity bits in the extra column plane 308 and the data column plane are prefetched, and then four of those bits are in each location (as necessary) based on the newly written parity bits, and then all 8 parity bits are written back. This may protect the extra four bits (so they are not inadvertently changed by a direct write operation, since no data is being written to those cells), at the cost of extra latency (e.g., tCCD_L_WR required for the extra read as part of the RMW).

The blocks in the first portion 301 and the second portion 302 represent the portions of those column planes that may be set aside for different storage, and do not necessarily represent a physical arrangement of where information is stored in the portion of the column planes, or the spatial relationship of the column planes in each portion to each other. For example, the first portion 301 may represent even column planes while the second portion 302 represents odd column planes, and the columns set aside for storing ECC bits may be distributed throughout the data column planes. In the example of FIG. 3, since 8 bits of ECC are needed for every 64 bits of data, each of the first portion 301 and the second portion 302 may have 93.75% of its total memory space used for data and 6.25% used for ECC bits when the enhanced ECC mode is enabled. In other words, from the controllers perspective, only 93.75% of the memory array may be addressed, since the remaining portion is set aside for the ECC data that is expected to come along with the data. With the non-Enhanced ECC mode, there may be 100% of the array set aside for data, but then the number of ECC parity bits is diluted to 8 ECC parity bits per 128 data bits, which is insufficient for SECDED ECC calculations.

Table 1 is a summary of different operations in the two different x4 modes according to some embodiments of the present disclosure.

TABLE 1

Comparison of Example Enhanced ECC and normal ECC Operational Modes

|  | Enhanced ECC Enabled | Enhanced ECC Disabled |
|---|---|---|
| Prefetch | 64d + 8p | 128d + 8p |
| Data CPs | Data + Parity | Data |
| Extra CP | Parity | Parity |
| % Array Available for Data | 93.75% | 100% |
| ECC | SECDED | SEC |
| Write Latency | Less than tCCD_L_WR | tCCD_L_WR |
| Column Planes accessed | 9 CS | 17 CS |

In Table 1, the notations d and p are used to represent data bits and parity bits, respectively. For example, the first row uses the notation 64d+ 8p to represent that in the Enhanced ECC mode. 64 data bits and 8 parity bits are fetched. The mode register may also have a setting which disables the Enhanced ECC mode.

In the non-Enhanced ECC mode, 128 bits of data and 8 parity bits are used by the ECC circuit 232, while in the Enhanced ECC mode, 64 bits of data and 8 bits of ECC parity are used by the ECC circuit 232. In the non-Enhanced ECC mode, the ECC circuit 232 may implement a SEC scheme, while in the Enhanced ECC mode, a SECDED scheme may be used. That is, since a higher ratio of ECC parity to data bits is used in the Enhanced ECC mode, more robust error protection may be offered.

Figure 4:
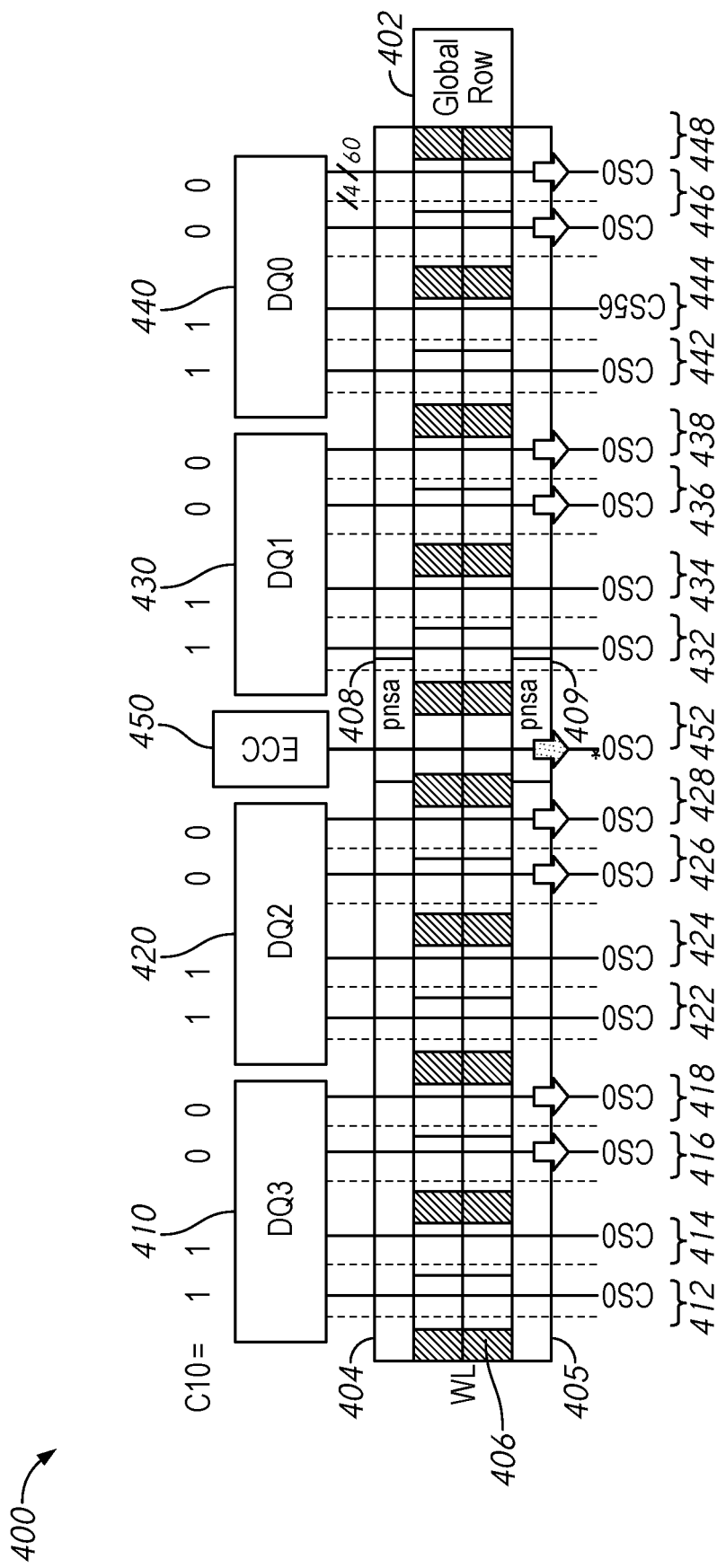
FIG. 4 is a schematic diagram of a portion of a memory bank according to some embodiments of the present disclosure.

The Enhanced ECC mode may draw less power than the non-Enhanced ECC mode. In the Enhanced ECC mode, CS signals may only be provided to the selected half of the column planes (based on C10). Accordingly, only half of the column planes need to activate their switches, drive voltages along LIO lines, etc. This may reduce the power draw of a single access operation. For example, in the non-Enhanced ECC mode, 17 different CS signals (16 data column planes and 1 extra column plane) and their associated LIOs/GIOs etc. are fired, while in the Enhanced ECC mode, 9 different CS signals and their associated LIOs/GIOs etc. are fired FIG. 4 is a schematic diagram of a portion of a memory bank according to some embodiments of the present disclosure. The memory bank 400 may, in some embodiments, be included in the memory 100 of FIG. 1, 200 of FIG. 20, and/or 300 of FIG. 3. The memory bank 400 shows a simplified schematic view of a layout of memory bank along with example signals which may be used to activate various columns in the column planes as part of a second x4 operational mode (e.g., a one-pass x4 operational mode).

Similar to FIG. 3. FIG. 4 is described with respect to an example embodiment where there are 16 data column planes, each of which includes 64 sets of bit lines (e.g., 64 values of the CS signal) each of which provides 8 bits of data when activated by the respective CS signal. It should be understood that this is one example implementation of the present disclosure, and that other arrangements may be used in other example embodiments (e.g., more or fewer CS sets per CP, more or fewer CP's per memory bank, etc.).

The memory bank 400 shows a memory organized into sixteen column planes 412-448 (e.g., 210 of FIGS. 2 and/or 301-302 of FIG. 3), each of which is associated with a DQ pad 410-440. So a first DQ pad DQ3 410 is associated with column planes 412-418, a second DQ pad DQ2 420 is associated with column planes 422-428, a third DQ pad DQ1 430 is associated with column planes 432-438, and a fourth DQ pad DQ0 440 is associated with column planes 442-448. In the example x4 mode of FIG. 4, each of the four DQ pads DQ3-0 410, 420, 430 and 440 handles 16 data bits as part of an access operation, for a total of 64 data bits. In addition to the four DQ pads 410, 420, 430, and 440, the memory bank 400 may be associated with an ECC terminal 450, which may be used to send/receive ECC parity data as part of an access operation. The ECC terminal 450 may be associated with an extra column plane 452 (e.g., the extra column plane 212 of FIG. 1 and/or the extra column plane 308 of FIG. 3). In the simplified view of FIG. 4, a single word line WL is shown, along with a global row decoder 402 which drives the word line. Similarly, only selected lines are shown for the bit lines, each of which represents a set of bit lines activated by a common CS signal in that CP. When activated, the bit lines are coupled onto respective LIO lines.

The memory bank 400 is organized with the cells of the memory array between two sense amplifier regions 404. The sense amplifier regions 404 may be elongated in a same direction as the word line WL. The column planes 412-448 are separated by sub word line (SWL) drivers 406. Each column plane is adjacent to one other column plane and to a SWL driver 406. For example, the column plane 412 is adjacent to a SWL driver 406 on one side and to the column plane 414 on the other side. The column plane 414 is adjacent to the column plane 412 on a first side and to a second SWL driver 406 on the opposite side. On the opposite side of that SWL driver 406 is another column plane 416 and so forth.

Accordingly, each data terminal is associated with four column planes, two pairs of column planes which are adjacent to each other, and which are separated from the other pair by a SWL driver. Each pair is associated with a different value of the column plane selection bit C10. For example, the first DQ pad 410 is associated with column planes 412 and 414, both of which are activated by C10 at a high logical level, and with column planes 416 and 418, both of which are activated by C10 at a low logical level. Accordingly, the column planes 412, 414, 422, 424, 432, 434, 442, and 444 all contain data which is accessed when C10=1 and the column planes 416, 418, 426, 428, 436, 438, 446, and 448 all contain data which is accessed when C10=0. Whichever set of column planes is selected by C10, one or more column planes of the other set may be used to store the ECC parity bits.

FIG. 4 shows an example access operation in an enhanced ECC mode. The memory device receives a column address which includes C10=0 and which has a value that decoders to the first column select signal CS0. Accordingly, CS0 is provided by the column decoder to the column planes 416, 418, 426, 428, 436, 438, 446, and 448, and the bit lines associated with CS0 in each of those column planes each provide 8 bits of data. The column decoder also provides CS0 to the extra column plane 452 and/or generates an additional CS signal to provide it to one of the column planes not selected by the value of C10 to retrieve the ECC parity data. In this example embodiment, a value CS56 is provided to the column plane 444. Accordingly, the column plane 444 provides 8 bits of ECC parity. In this manner, from a single access pass, 64 bits of data (8 each from column planes 416, 418, 426, 428, 436, 438, 446, and 448) and 8 bits of parity (from column plane 444) are accessed. The arrows are used to show which CS signals and which column planes are accessed as part of a single access pass.

In other words, the column decoder (e.g., 110 of FIG. 1) may activate the digit lines and couple them to the LIOs for the column planes 416, 418, 426, 428, 436, 438, 446, and 448. This may represent all of the LIOs (e.g., 8 LIOs per column plane) which are available for the column planes activated by C10=0. However, in the set of column planes associated with C10=1, the column decoder may activate fewer than all of the LIOs, since only CS56 in column plane 444 is coupled to the LIO. The remaining LIOs associated with the column planes activated by C10=1 are unused in this access operation.

While not shown in FIG. 4, a similar access may happen as part of a second access operation where a column address is received which includes C10=1, but the same decoded value of CS. In that example, the column decoder provides CS0 to the column planes 412, 414, 422, 424, 432, 434, 442, and 444, and to the extra column plane 450, while a CS56 value is provided to the column plane 448. Note that the same 8 bits may be provided from the extra column plane 452, but that the value of C10 controls which portion of those 8 bits are provided.

The controller may have different ranges of addressable values based on the mode the memory is operating in. In this example, the controller may generate column addresses which are associated with CS values over a range of CS0 to CS55. However, CS55 to CS63 may represent 'unaddressable' space, since the controller cannot directly access these columns (which are set aside for parity).

Figure 5:
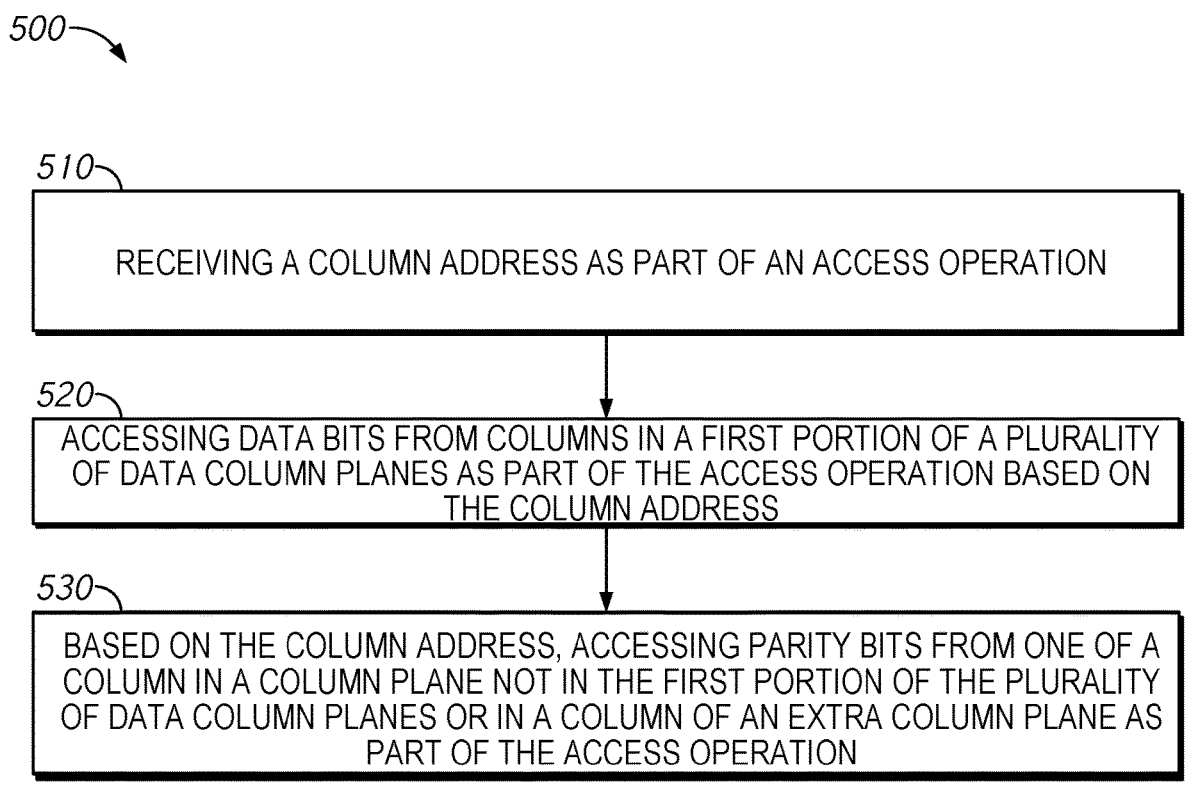
FIG. 5 is a flow chart of a method for performing enhanced ECC operation according to some embodiments of the present disclosure.

FIG. 5 is a flow chart of a method for performing enhanced ECC operation according to some embodiments of the present disclosure. The method 500 may, in some embodiments, be implemented by one or more of the apparatuses or systems described herein. For example, the method 500 may be implemented, a least in part, by the memory 100 of FIG. 1, the memory device 200 of FIG. 2, the memory array 300 of FIG. 3, and/or the memory bank 400 of FIG. 4.

The method 500 may include receiving a column address as part of an access operation, at 510. In some examples, method 500 may also include receiving row and bank addresses as well as an access command as part of the access operation. For example, the addresses and command may be received along C/A terminals of the memory, such as the C/A terminals of FIG. 1.

The method 500 may further include accessing data bits from columns in a first portion of a plurality of data column planes as part of the access operation based on the column address, at 520. In some examples the method 500 may include selecting the first portion of the plurality of data column planes based on the column address. In some examples, the method 500 may include selecting a first half of the column planes as the first portion or selecting a second half of the column planes as the first portion. The column address may include a column plane selection bit (e.g., C10) that specifies which column plane is in the first portion or not. For example, the method 500 may include selecting the first half when the column plane selection bit is in a first state and selecting the second half when the column plane selection plane is in a second state. In some examples, the method 500 may include generating, with a column decoder (e.g., 110 of FIG. 1) column select signals associated with the access operation.

The method 500 may further include, based on the column address, accessing parity bits from one of a column in a column plane not in the first portion of the plurality of data column planes or in a column of an extra column plane as part of the access operation, at 530. For example, the method 500 may include accessing the parity bits from the column in the column plane not in the first portion of the plurality of data column planes in response to the column address having a first value, and accessing the parity bits from the column in the extra column plane in response to the column address having a second value. In some examples, the method 500 may further include correcting an error in the data bits based on the parity bits with an error correction code (ECC) circuit. For example, the method 500 may include performing single error correction, double error detection (SECDED) with an error correction code (ECC) circuit using the parity bits.

Figure 6:
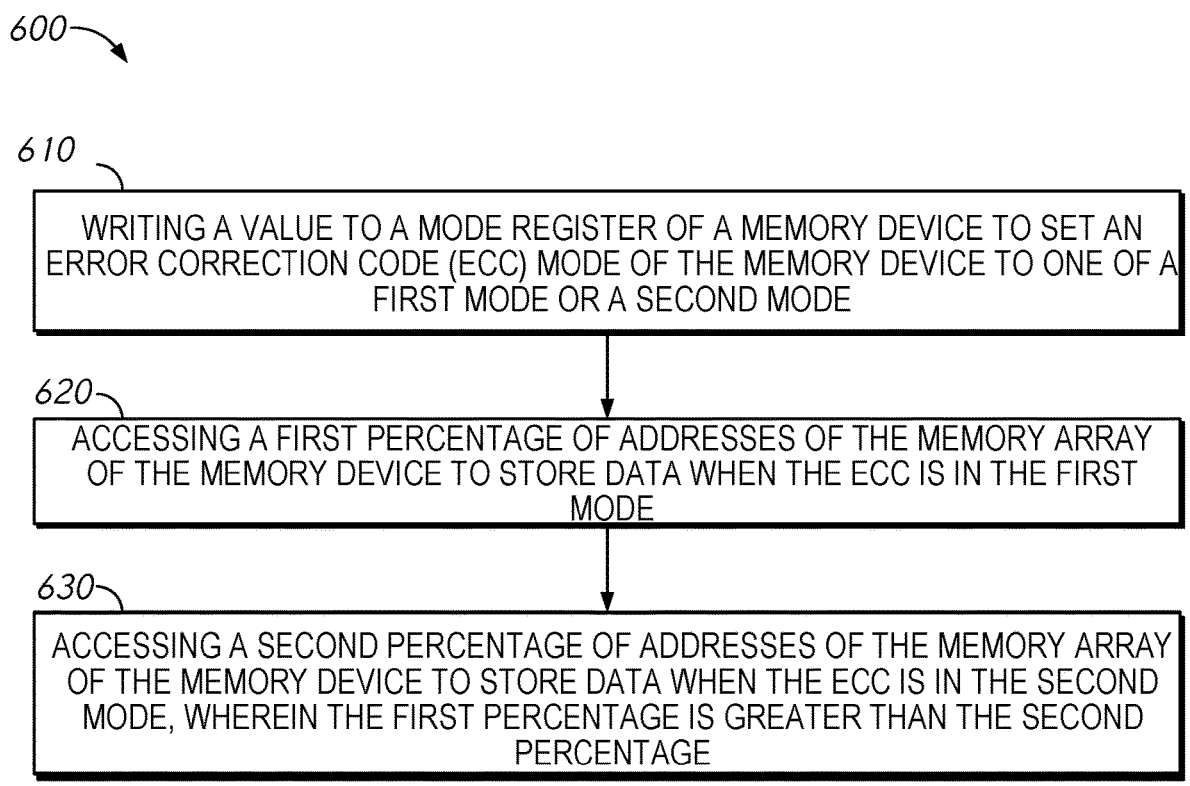
FIG. 6 is a flow chart of a method for writing an error correction code (ECC) mode to a mode register of a memory device according to some embodiments of the present disclosure.

In some examples, the method 500 may include performing a second access operation, such as: receiving a second column address as part of a second access operation; accessing second data bits from a second portion of the plurality of data column planes non-overlapping with the first portion of the plurality of data column planes as part of the second access operation based on the second column address; and based on the second column address, accessing parity bits from one of a column in the first portion of the plurality of data column planes or in a column of the extra column plane as part of the access operation FIG. 6 is a flow chart of a method for writing an error correction code (ECC) mode to a mode register of a memory device according to some embodiments of the present disclosure. The method 600 may, in some embodiments, be a method of operating a memory device. For example, the method 600 may be implemented by a controller such as controller 150 of FIG. 1 when it operates a memory, such as the semiconductor device 100 of FIG. 1, the memory device 200 of FIG. 2, the memory array 300 of FIG. 3, and/or the memory bank 400 of FIG. 4.

The method 600 includes writing a value to a mode register of a memory device to set an error correction code (ECC) mode of the memory device to one of a first mode or a second mode, at 610. For example the controller may perform a MRW operation to write a value to one or more registers that control the ECC mode the memory is in. In some examples, the first mode and the second mode are both x4 modes of the memory device. In some examples, the method 600 further includes writing 64 bits of data to the memory array in the first and the second modes. For example, the controller may provide 64 bits of data in 4 16 bit bursts. In some examples, the first mode represents a single error detection ECC mode and the second mode represents a single error correction, double error detection (SECDED) ECC mode.

The method 600 may further include accessing a first percentage of addresses of the memory array of the memory device to store data when the ECC is in the first mode, at 620.

The method 60) may further include accessing a second percentage of addresses of the memory array of the memory device to store data when the ECC is in the second mode, wherein the first percentage is greater than the second percentage, at 630. In some examples, the method 600 further includes a third percentage of addresses are set aside for storage of ECC parity data. The third percentage may be based on a difference between the first percentage and the second percentage. In some examples, the method 600 further includes accessing the memory array one time to write the data in both the first mode and the second mode.

The method 600 may include generating a column address associated with the addressable area of the memory array based on the first or second mode. Accordingly, when the memory is in the first mode the controller may generate column addresses associated with a first range of CS values (e.g., CS0 to CS63), and when the memory is in the second mode, the controller may generate column addresses associated with a second range of CS values (e.g., CS0 to CS54).

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a first data column plane comprising a first bit line;
   a second data column plane comprising a second bit line;
   an extra column plane comprising a third bit line;
   a column decoder configured to, as part of an access operation, activate the first bit line, and activate at least one of the second bit line or the third bit line; and
   an error correction code (ECC) circuit configured to, as part of the access operation:
   access data bits along the first bit line,
   in a first mode, access additional data bits along the second bit line and parity bits along the third bit line, and
   in a second mode, access the parity bits along the activated one of the second or third bit line.

2. The apparatus of claim 1, wherein, as part of a second access operation:
   the column decoder is configured to activate a fourth bit line of the second data column plane and activate one of a fifth bit line of the first data column plane or a sixth bit line of the extra column plane; and
   the ECC circuit is configured to access second data bits along the fourth bit line and parity bits along the activated one of the fifth or sixth bit line.

3. The apparatus of claim 2, wherein the column decoder is configured to activate the first bit line during the access operation based on a column select bit of a first column address having a first value specifying that the data bits are stored at the first data column plane and to activate the fourth bit line during the second access operation based on the column select bit of a second column address having a second value specifying that the second data bits are stored at the first data column plane.

4. The apparatus of claim 1, wherein the column decoder is configured to selectively activate the one of the second bit line or the third bit line bit lines based on a received column address.

5. The apparatus of claim 1, wherein the first data column plane has a same number of memory cells as the extra column plane.

6. The apparatus of claim 1, further comprising an input/output circuit configured to receive the data bits from the ECC circuit if the access operation is a read operation and configured to provide the data bits to the ECC circuit if the access operation is a write operation.

7. The apparatus of claim 1, wherein the ECC circuit is configured to locate and correct errors in the data bits based on the parity bits when the access operation is a read operation.

8. The apparatus of claim 1, wherein responsive to a column address received as part of the access operation, the column decoder is configured to provide a column select signal with a first value to the first data column plane, and to provide one of a second column select signal with a second value to the second data column plane or a third column select signal with the first value to the extra column plane.

9. The apparatus of claim 8, wherein the apparatus is a memory device operating in an x4 mode.

10. An apparatus comprising:
    a memory bank comprising:
    a first plurality of column planes;
    a second plurality of column planes; and
    an extra column plane; and
    a column decoder configured to select the first or the second plurality of column planes based on a column address received as part of an access operation, wherein as part of the access operation data bits are accessed in the selected one of the first or the second plurality of column planes, and based on the column address, parity bits are accessed in one of the extra column plane or the non-selected one of the first or the second plurality of column planes, wherein in a first mode, additional data bits are accessed in the other one of the first or the second plurality of column planes and the parity bits are accessed in the extra column plane, and wherein in a second mode, the parity bits are accessed in the second plurality of column planes or the extra column plane.

11. The apparatus of claim 10, further comprising an error correction code (ECC) circuit configured to locate and correct errors in the data bits based on the parity bits.

12. The apparatus of claim 10, wherein the ECC circuit is configured to perform single error correction, double error detection (SECDED) based on the parity bits and the data bits in the second mode.

13. The apparatus of claim 12, wherein the column decoder is configured to decode the column address to determine whether the parity bits are stored at the extra column plane or the non-selected one of the first or the second plurality of column planes.

14. The apparatus of claim 10, wherein the column decoder is configured to select the one of the first plurality of column planes or the second plurality of column planes based on a column plane select bit of the column address.

15. A method comprising:
receiving a column address as part of an access operation;
accessing data bits from columns in a first portion of a plurality of data column planes as part of the access operation based on the column address; and
based on the column address, accessing parity bits from one of a column in a column plane not in the first portion of the plurality of data column planes or in a column of an extra column plane as part of the access operation,
wherein in a first mode, accessing additional data bits from the one of the column in the column plane in the first portion of the plurality of data column planes and the parity data bits in the column of the extra column plane, and
wherein in a second mode, accessing the parity data bits from the one of the volume in the column plane not in the first portion of the plurality of data column planes or in the column of the extra column plane.

16. The method of claim 15, further comprising correcting an error in the data bits based on the parity bits with an error correction code (ECC) circuit.

17. The method of claim 15, further comprising performing single error correction, double error detection (SECDED) with an error correction code (ECC) circuit using the parity bits in the second mode.

18. The method of claim 15, further comprising accessing the parity bits from the column in the column plane not in the first portion of the plurality of data column planes in response to the column address having a first value.

19. The method of claim 18, further comprising accessing the parity bits from the column in the extra column plane in response to the column address having a second value.

20. The method of claim 19, further comprising:
receiving a second column address as part of a second access operation;
accessing second data bits from a second portion of the plurality of data column planes non-overlapping with the first portion of the plurality of data column planes as part of the second access operation based on the second column address; and
based on the second column address, accessing parity bits from one of a column in the first portion of the plurality of data column planes or in a column of the extra column plane as part of the access operation.

* * * * *